Patented Feb. 27, 1945

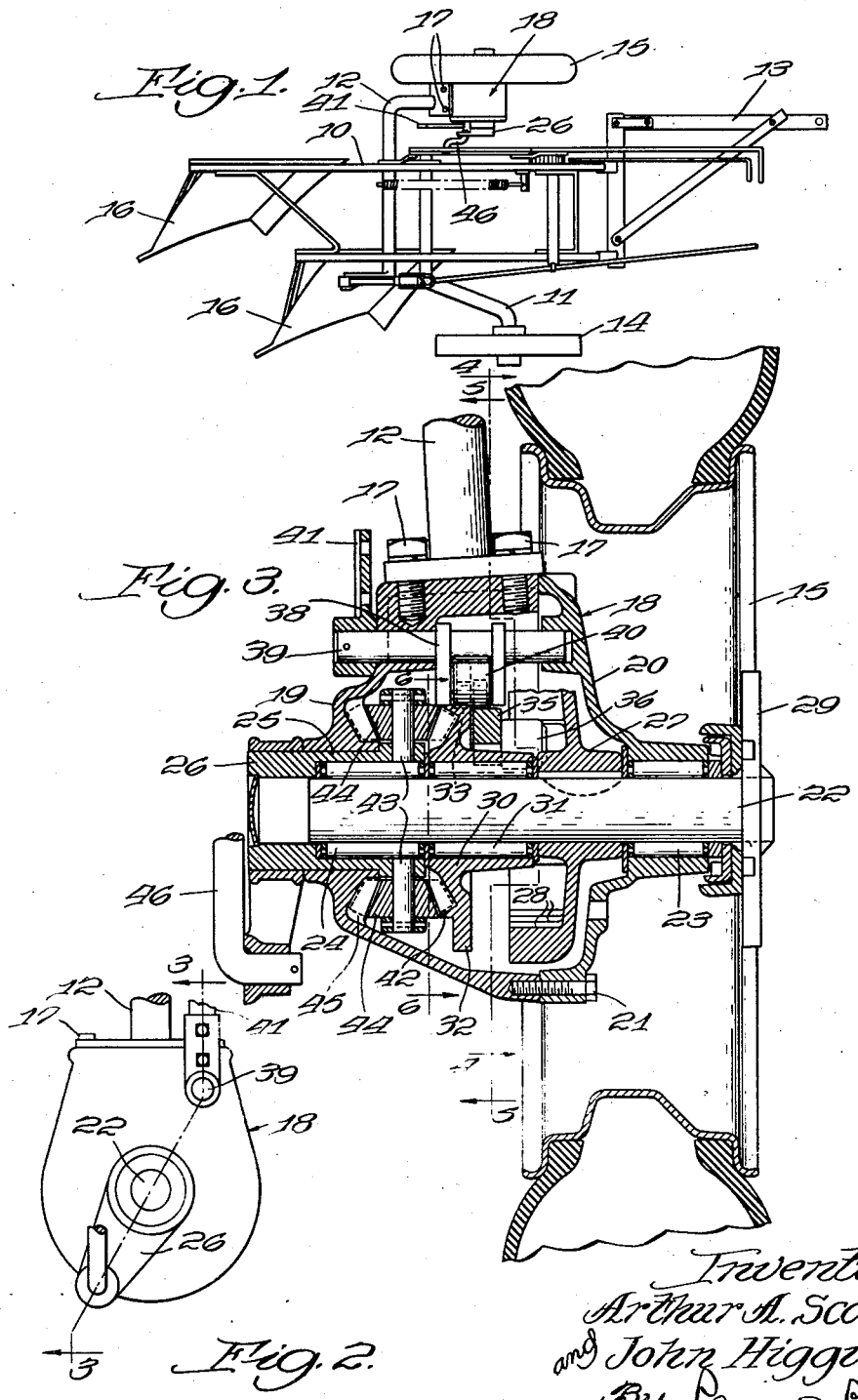

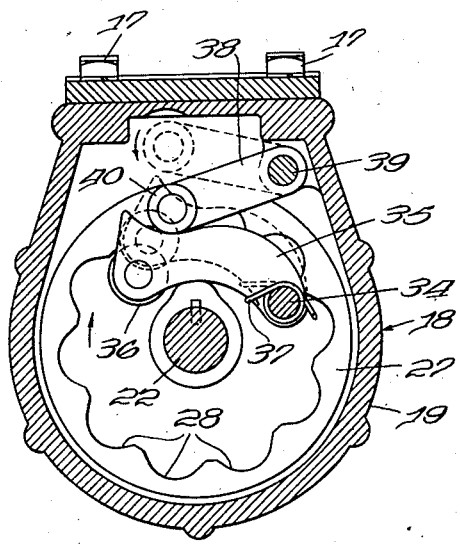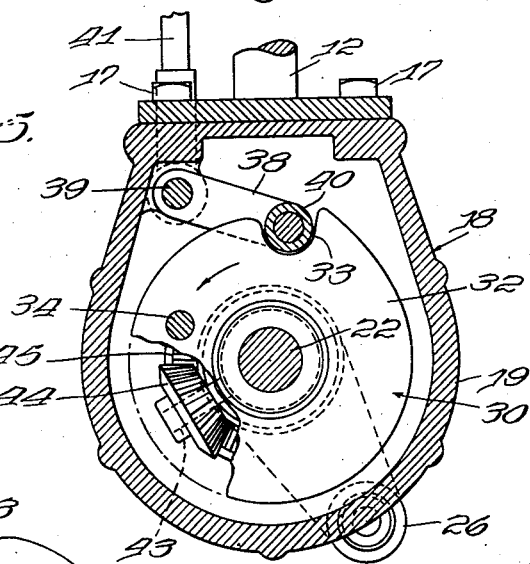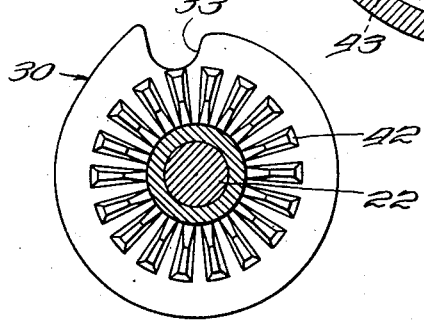

2,370,197

UNITED STATES PATENT OFFICE 2,370,197

POWER LIFT

Arthur A. Scarlett and John Higginson, Hamilton, Ontario, Canada, assignors, by mesne assignments, to International Harvester Company, Chicago, Ill., a corporation of New Jersey Application December 31, 1942, Serial No. 470,736

7 Claims. (Cl. 74—303)

This invention relates to a power-lift and more particularly to a power-lift of the type adapted to be used with an agricultural implement, such as a plow.

The invention contemplates and has for its principal object the provision of an improved power-lift having reduction gearing for the purpose of increasing the efficiency of the lift under certain conditions. Among such conditions is that resulting from the use on plows or other implements of smaller sized wheels because of the use of rubber tires. In such cases slippage of the wheel is somewhat greater than in the case of the use of a larger wheel. It is desirable, therefore, to increase the leverage in the power-lift mechanism.

Other objects of the invention are to provide an improved power-lift including a lubricant-tight housing containing the lift mechanism; to provide improved gearing preferably of the planetary type; to incorporate in the housing a gear member cooperable with the gearing of the lift mechanism; and to provide improved control means for the operation of the lift.

Other objects and desirable features of the invention will become apparent as the disclosure is more fully made in the followed detailed description and accompanying sheets of drawings, in which:

Figure 1 is a plan view showing a plow as representative of one type of agricultural implement in which the improved power-lift may be embodied;

Figure 2 is a side view in elevation of the improved lift;

Figure 3 is an enlarged, sectional view taken substantially on the line 3—3 of Figure 2;

Figure 4 is a sectional view taken on the line 4—4 of Figure 3;

Figure 5 is a sectional view taken on the line 5—5 of Figure 3; and

Figure 6 is a view of the intermittently rotatable lift part, as viewed along the line 6—6 of Figure 3.

The principles of the invention may be embodied in many forms, and the power-lift unit may be used in several instances. Accordingly, the illustration of the lift, in conjunction with the plow in Figure 1, is to be taken as representative and not limiting.

As shown in Figure 1, the plow comprises generally a main frame structure 10 carried on a pair of crank axles 11 and 12 and having a forward draft frame 13. The right-hand crank axle 11 has journaled thereon a furrow wheel 14, and the left-hand crank axle 12 carries a land wheel 15. The frame includes a pair of plow bottoms 16, which operate in the usual manner to form furrows and which may be raised and lowered by the power-lift mechanism, to be described in detail below.

As shown in Figure 3, the lower end of the crank axle 12 is flanged and secured by bolts 17 to a lubricant-tight casing or housing 18. The housing comprises right- and left-hand mating sections 19 and 20 removably secured together by a plurality of bolts 21.

A transverse driving shaft 22 is journaled in the casing 18 by means of an antifriction bearing 23 in the casing part 20 and in a second antifriction bearing 24 carried in a sleeve 25 that is formed as part of a driven element or crank 26, which is journaled in the casing section 19. The bearings 23 and 24 are shown as being of the roller type, although it will be obvious that any suitable form of bearing may be employed.

The shaft 22 has keyed thereto within the housing 18 a driving clutch part 27. This part is generally cup-shaped and has an outer flange having its inner periphery provided with a plurality of notches or engaging portions 28, as best shown in Figure 4. The outer end of the driving shaft 22 has rigidly secured thereto a driving flange 29, which is rigidly secured to or forms a part of the land wheel 15.

The shaft 22 has journaled thereon intermediate its ends and within the housing 18 an intermittently rotating member 30. A roller bearing 31 preferably forms the journaling medium. The member 30 includes a radial plate portion 32 having at one portion of its edge a notch or engageable portion 33. The face of the plate 32 toward the clutch member 27 carries a transversely extending stud 34, on which is pivoted a clutch pawl 35 (Figure 4). The pawl carries at its free end a roller 36 adapted to be engaged with certain of the notches 28 of the clutch member 27. A tension spring 37 cooperates with the stud 34 and the pawl 35 to urge the pawl 35 toward engagement with one of the notches 28 of the clutch member 27.

As best shown in full lines in Figure 4, the pawl 35 is normally maintained out of engagement with the clutch member 27 by means of a control member 38. This member is keyed at one end to a transverse rock-shaft 39 journaled in the casing 18. The member carries at its other end a roller 40 adapted to engage the upper curved surface of the pawl 35. An operating lever 41 is keyed to the extending end of the rock-shaft 39 and is normally positioned so that the rock-shaft effects a downward pressure on the control member 38, which in turn results in downward pressure on the pawl 35 to move the pawl into disengaged position.

It will be seen from the description thus far that during normal plowing operation the shaft 22 is rotated by the land wheel 15. Since the control member 38 is positioned to maintain the disengagement of the pawl 35, the shaft 22 and clutch member 27 rotate freely without any effect on the remainder of the lift mechanism. Actuation of the lever 41 results in upward movement of the control member 38 and consequent upward movement of the pawl 35 so that the roller 36 becomes engaged with one of the notches 28 in the clutch member 27. This results in the driving of the plate 32, on the intermittently rotating member 30, by the shaft 22 and clutch member 27.

As previously stated, the plate 32 of the member 30 is provided with the notch 33. When the plow is in normal plowing operation, the plate 32 is held against rotation. The means for accomplishing this consists of the control member 38 and roller 40. As best shown in Figures 3 and 5, the roller 40 is of sufficient transverse width to permit engagement thereof with the notch 33 in the plate 32.

The face of the plate 32 away from the clutch member 27 is preferably formed as a bevel gear 42 (Figure 6). The sleeve portion 25 of the crank or driven member 26 is provided adjacent its inner end with a pair of diametrically extending spindles 43, each of which has journaled thereon a bevel pinion 44 meshing with the bevel gear 42 on the plate 32. The driven element 26 thus provides a carrier for the planet pinions 44. The interior wall of the casing part 19 is provided with integral teeth forming a second bevel gear 45 meshing with the bevel pinions 44.

The crank or driven member 26 is connected by a link 46 to the plow frame in the usual manner.

The function of the power lift as far as concerns the clutch means 27-35 has been described above, with respect to the normal or plowing function of the plow. When it is desired to raise the plow bottom 16 from the furrows, the lever 41 is actuated to rock the rock-shaft 39 in a clockwise direction, as viewed in Figure 4 (or a counter-clockwise direction as viewed in Figure 5). This results in a raising of the control member 38 so that the roller 40 is disengaged from the notch 33 in the plate 32. At the same time, the pawl 35 is released for engagement of the roller 36 with a notch 28 in the clutch member 27, and thus the plate 32 and its integral bevel gear 42 are rotated. The driven member 26 is then driven at a reduced speed through the medium of the bevel gears 42 and 45 and the bevel pinions 44. The intermittently rotating member 30, including the plate 32 and bevel gear 42, is rotated one full revolution, after which the notch 33 again presents itself for engagement with the roller 40 on the control member 38. The lever 41 having been released, the control member 38 and roller 40 are permitted to drop downwardly. The roller 40 engages the notch 33 and at the same time engages the pawl 35, thus disengaging the pawl from the clutch member 27. With the clutch disengaged and the plate 32 locked against rotation, the plow bottoms 16 are held in raised position and may remain in that position until the lift mechanism is again actuated to cause another revolution of the plate 32 for the lowering of the bottoms.

It will be seen from the above description that the improved lift mechanism embodies the principles of the invention to the extent that the foregoing objects are achieved in a desirable manner. Other objects of the invention will undoubtedly suggest themselves to those skilled in the art. It will be understood, of course, that the foregoing description and illustrations are of a preferred embodiment of the invention, and it is not intended thereby to limit the scope of the appended claims.

What is claimed is:

1. A power-lift: comprising a support; a constantly rotating driving shaft journaled in the support; a coaxial driven member journaled in the support; a coaxial bevel gear journaled on the driving shaft; releasable means engageable with said bevel gear for normally holding said gear against rotation during rotation of said driving shaft, clutch means between said shaft and gear arranged to drivingly engage said shaft and gear upon release of said releasable means; a plurality of bevel pinions rotatably carried by the driven member on axes perpendicular to the axis of the driving shaft and meshing with the aforesaid bevel gear; and a bevel gear coaxial with the driving shaft, meshing with the bevel pinions and non-rotatably carried by the support.

2. A power-lift: comprising a support; a constantly rotating driving shaft journaled in the support; a coaxial driven member journaled in the support; a coaxial bevel drive gear journaled in the support; releasable means engageable with said bevel gear for normally holding said gear against rotation during rotation of said driving shaft, clutch means between said shaft and gear arranged to drivingly engage said shaft and gear upon release of said releasable means; a plurality of pinions rotatably carried by the driven member and meshing with the aforesaid drive gear; and a gear element meshing with the pinions and non-rotatably carried by the support.

3. A power-lift: comprising a housing; a driving shaft journaled in the housing; a driven element journaled in the housing; an intermittently rotatable driven plate coaxial with the driving shaft and journaled in the housing; releasable means normally holding the plate against rotation: clutch means between the plate and the driving shaft; means for releasing the plate and for engaging the clutch to drive said plate from the driving shaft; a bevel gear secured to the plate for rotation therewith; bevel pinions rotatably carried by the driven element and meshing with the bevel gear; and a bevel gear non-rotatably secured to the support and meshing with the bevel pinions.

4. A power-lift: comprising a support; a constantly rotating driving element journaled in the support; a driven element journaled in the support; an intermittently rotatable drive gear journaled in the support; clutch means between the driving element and the drive gear; reduction gearing between said drive gear and the driven element and including a gear on the driven element and a gear non-rotatably carried by the support; releasable means normally holding the drive gear against rotation; and means for releasing the drive gear and for actuating the clutch.

5. A power-lift: comprising a housing; a constantly rotating driving element journaled in the housing; a driven element journaled in the housing; an intermittently rotatable drive gear journaled in the housing; clutch means between the driving element and the drive gear; reduction gearing contained in the housing and connected between said drive gear and the driven element and including a gear on the driven element and a non-rotatable gear integrally formed on the housing; releasable means normally holding the drive gear against rotation; and means for releasing the drive gear and for actuating the clutch.

6. A power-lift: comprising an enclosed housing; a driving shaft journaled in the housing; a clutch member keyed to the shaft within and at one side of the housing; a driven element journaled on the shaft at the other side of the housing and having a first portion within the housing and a second portion outside the housing; a pair of spindles carried by the first portion of the driven element and disposed thereon on axes perpendicular to the axis of the driving shaft; bevel pinions rotatably carried by the spindles; a bevel gear meshing with the pinions and journaled on the shaft between the pinions and the clutch member; means connectable between the clutch member and the bevel gear; including releasable means engageable with said bevel gear for normally holding said gear against rotation during rotation of said driving shaft, and a bevel gear within and integral with the housing and meshing with the bevel pinions.

7. A power-lift: comprising an enclosed housing; a driving shaft journaled in the housing; a clutch member keyed to the shaft within and at one side of the housing; a driven element journaled on the shaft at the other side of the housing and having a first portion within the housing and a second portion outside the housing; a pair of spindles carried by the first portion of the driven element and dispose thereon on axes perpendicular to the axis of the driving shaft; bevel pinions rotatably carried by the spindles; a bevel gear meshing with the pinions and journaled on the shaft between the pinions and the clutch member; means connectable between the clutch member and the bevel gear; a bevel gear within and integral with the housing and meshing with the bevel pinions; releasable means for normally holding the first bevel gear against rotation and for normally disconnecting the clutch member and said gear; and means for releasing the first bevel gear and for connecting said gear and the clutch member.

JOHN HIGGINSON.
ARTHUR A. SCARLETT.